United States Patent
Lee et al.

(10) Patent No.: US 9,554,135 B2
(45) Date of Patent: *Jan. 24, 2017

(54) METHOD, MEDIUM, AND SYSTEM COMPRESSING AND/OR RECONSTRUCTING IMAGE INFORMATION WITH LOW COMPLEXITY

(71) Applicant: Samsung Electronics Co., Ltd., Suwon-si, Gyeonggi-do (KR)

(72) Inventors: Sang-jo Lee, Suwon-si (KR); Si-hwa Lee, Yongin-si (KR); Do-hyung Kim, Yongin-si (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 14/943,769

(22) Filed: Nov. 17, 2015

(65) Prior Publication Data

US 2016/0073108 A1 Mar. 10, 2016

Related U.S. Application Data

(63) Continuation of application No. 14/198,068, filed on Mar. 5, 2014, now Pat. No. 9,232,221, which is a (Continued)

(30) Foreign Application Priority Data

Aug. 17, 2006 (KR) ........................ 10-2006-0077776

(51) Int. Cl.
*H04N 19/103* (2014.01)
*G06T 9/00* (2006.01)
(Continued)

(52) U.S. Cl.
CPC .............. *H04N 19/103* (2014.11); *G06T 9/00* (2013.01); *G09G 3/3648* (2013.01);
(Continued)

(58) Field of Classification Search
CPC .... H04N 19/103; H04N 19/186; H04N 19/12; H04N 19/90; H04N 11/042
See application file for complete search history.

(56) References Cited

U.S. PATENT DOCUMENTS

| | | |
|---|---|---|
| 5,034,804 A | 7/1991 | Sasaki et al. |
| 5,128,963 A | 7/1992 | Akagiri |

(Continued)

FOREIGN PATENT DOCUMENTS

| | | |
|---|---|---|
| CN | 1239380 A | 12/1999 |
| CN | 1558682 A | 12/2004 |

(Continued)

OTHER PUBLICATIONS

Chinese Office Action issued on Aug. 3, 2010 in corresponding Chinese Patent Application 2007101478701.

(Continued)

*Primary Examiner* — Robert Leung
(74) *Attorney, Agent, or Firm* — Harness, Dickey & Pierce

(57) ABSTRACT

A system, medium, and method compressing and/or restoring images. Such a data compression method may include selecting a mode from among a plurality of modes for compressing current data, according to predetermined criteria, and calculating a difference between the current data and reference data, according to the selected mode, and compressing the current data, or truncating a part of the current data and compressing the current data. Accordingly, it is possible to significantly lower the complexity of an (Continued)

image encoder/decoder system and exactly meet a picture-based CBR required by LCD DCC devices/systems.

20 Claims, 19 Drawing Sheets

Related U.S. Application Data continuation of application No. 11/890,496, filed on Aug. 7, 2007, now Pat. No. 8,705,635.

(51) Int. Cl.

| | |
|---|---|
| *G09G 3/36* | (2006.01) |
| *H04N 19/12* | (2014.01) |
| *H04N 19/186* | (2014.01) |
| *H04N 19/90* | (2014.01) |
| *H04N 11/04* | (2006.01) |
| *G09G 3/20* | (2006.01) |
| *G09G 5/02* | (2006.01) |

(52) U.S. Cl.
CPC ........... *H04N 11/042* (2013.01); *H04N 19/12* (2014.11); *H04N 19/186* (2014.11); *H04N 19/90* (2014.11); *G09G 3/2011* (2013.01); *G09G 5/02* (2013.01); *G09G 2320/0252* (2013.01); *G09G 2320/0261* (2013.01); *G09G 2340/16* (2013.01)

(56) References Cited

U.S. PATENT DOCUMENTS

| | | | |
|---|---|---|---|
| 5,376,968 A | 12/1994 | Wu et al. | |
| 5,388,209 A | 2/1995 | Akagiri | |
| 5,612,743 A | 3/1997 | Lee | |
| 5,838,375 A | 11/1998 | Kim et al. | |
| 6,078,689 A | 6/2000 | Kunitake et al. | |
| 6,148,111 A | 11/2000 | Creusere | |
| 6,208,689 B1 | 3/2001 | Ohira et al. | |
| 6,427,025 B1 | 7/2002 | Shimomura et al. | |
| 6,553,143 B2 | 4/2003 | Miyake et al. | |
| 6,594,312 B1 | 7/2003 | Webb | |
| 6,614,483 B1 | 9/2003 | Lee et al. | |
| 6,639,942 B1 | 10/2003 | Bayazit | |
| 6,700,934 B2 | 3/2004 | Lin | |
| 7,421,132 B2 | 9/2008 | Okada | |
| 7,715,638 B2 | 5/2010 | Kalevo | |
| 2001/0028747 A1 | 10/2001 | Sato et al. | |
| 2001/0054131 A1 | 12/2001 | Alvarez et al. | |
| 2002/0094031 A1 | 7/2002 | Ngai et al. | |
| 2003/0012275 A1 | 1/2003 | Boice et al. | |
| 2003/0185297 A1 | 10/2003 | Greenfield et al. | |
| 2004/0105586 A1 | 6/2004 | Bayazit | |
| 2004/0202375 A1* | 10/2004 | Kalevo .................. | H04N 19/50 382/239 |
| 2005/0012856 A1 | 1/2005 | Aoyama et al. | |
| 2005/0062886 A1 | 3/2005 | Hoshino et al. | |
| 2005/0123039 A1 | 6/2005 | Song et al. | |
| 2005/0200631 A1 | 9/2005 | Pan et al. | |
| 2005/0243917 A1 | 11/2005 | Lee | |
| 2006/0115166 A1 | 6/2006 | Sung et al. | |
| 2006/0159357 A1* | 7/2006 | Mizuno ................ | H04N 19/647 382/239 |
| 2006/0239576 A1 | 10/2006 | Mukherjee | |
| 2008/0049837 A1 | 2/2008 | Tanaka et al. | |

FOREIGN PATENT DOCUMENTS

| | | |
|---|---|---|
| JP | 795583 | 4/1995 |
| JP | 10098731 | 4/1998 |
| JP | 200083029 | 3/2000 |
| JP | 2006-517065 A | 7/2006 |
| KR | 19930019019 | 9/1993 |
| KR | 19990060131 | 7/1999 |
| KR | 20020027781 A | 4/2002 |
| WO | WO-2004/064402 A1 | 7/2004 |

OTHER PUBLICATIONS

Sung-Jo Koo et al., P-53: A New Method for Improvement of Response Time by Data Compression Using Color Space Conversion, Platform Design 3 Team, LG., Philips LCD, Jinyung-Dong, Kumi Korea, 2005 pp. 474-477.
Extended European Search Report mailed May 20, 2011 corresponds to European PatentApplication No. 07112594.2-1247.
Japanese Office Action issued Jan. 17, 2012 corresponds to Japanese Patent Application No. 2007-189568.
M. Roth, "CS 301 Course Notes", CS 301: Assembly Language Programming, University of Alaska Fairbanks, Nov. 1998, Online: http://www.cs.uaf.edu/-cs301/notes/Chapter5/node4.html.
Japanese Notice of Reason for Rejection issued Nov. 25, 2011, corresponds to Japanese Patent Application No. 200-282113.
Extended European Search Report dated Oct. 7, 2009 corresponding to European Application No. 07121995.0-2223.
Non-Final Office Action mailed Mar. 12, 2012 in copending U.S. Appl. No. 11/890,497.
Non-Final Office Action mailed Sep. 26, 2011 in copending U.S. Appl. No. 11/890,497.
Notice of Allowance mailed Oct. 16, 2012 in copending U.S. Appl. No. 11/890,497.
Application No. KR10-2006-0077776, KIPO, Written Decision issued on May 22, 2013.
Application No. JP2007-282113, JPO, Decision to Grant a Patent issued on Mar. 5, 2013.
J. G. Apostolopoulos, "Video Compression" Streaming Media Systems Group-Hewlett-Packard Laboratories, Apr. 24, 2001.
M. Roth, "CS 301 Course Notes", CS 301: Assembly Language Programming, University of Alaska Fairbanks, Nov. 1998, Online: http://www.cs.uaf.edu/-cs301/notes/Chapter5/node4html.
U.S. Office Action mailed Oct. 28, 2011 in corresponding U.S. Appl. No. 11/890,496.
U.S. Office Action mailed Apr. 12, 2012 in corresponding U.S. Appl. No. 11/890,496.
U.S. Office Action mailed Jan. 24, 2013 in corresponding U.S. Appl. No. 11/890,496.
U.S. Notice of Allowance mailed Jul. 26, 2013 in corresponding U.S. Appl. No. 11/890,496.
U.S. Notice of Allowance mailed Jan. 4, 2013 in corresponding U.S. Appl. No. 11/890,496.

* cited by examiner

FIG. 7

| | MODE | 4 | R/G | B |
|---|---|---|---|---|
| ALLOCATION BIT | | | 16/16 | 12 |
| OPERATION | $P_0$ | | $P_0 >> 0 - P_{-1} >> 0$ | $P_0 >> 0 - P_{-1} >> 0$ |
| | $P_1 / P_2$ | | $P_n >> 0 - P_0 >> 0$ | $P_n >> 0 - P_0 >> 0$ |
| | $P_3$ | | $P_3 >> 0 - (P_1 >> 0 + P_2 >> 0)/2$ | $P_3 >> 0 - (P_1 >> 0 + P_2 >> 0)/2$ |
| DIFFERENCE RANGE | — | | $-8 \sim 7$ | $-4 \sim 3$ |
| MAXIMUM ERROR (ORIGINAL→RECON.) | — | | 0 | 0 |

FIG. 8

R  
MSB P0 P1 P2 P3

G  
MSB P0 P1 P2 P3

B  
MSB P0 P1 P2 P3

| | MODE | R/G | B |
|---|---|---|---|
| ALLOCATION BIT | 4 | 16/16 | 12 |
| OPERATION | $P_0$ | $P_0 >> 0 - P_{-1} >> 0$ | $P_0 >> 0 - P_{-1} >> 1$ |
| | $P_1 / P_2$ | $P_n >> 0 - P_0 >> 0$ | $P_n >> 1 - P_0 >> 1$ |
| | $P_3$ | $P_3 >> 0 - (P_1 >> 0 + P_2 >> 0)/2$ | $P_3 >> 1 - (P_1 >> 1 + P_2 >> 1)/2$ |
| DIFFERENCE RANGE | — | $-8 \sim 7$ | $-8 \sim 7$ |
| MAXIMUM ERROR (ORIGINAL→RECON.) | — | 0 | 1 |

FIG. 10

| | MODE | R/G | B |
|---|---|---|---|
| ALLOCATION BIT | 4 | 16/16 | 12 |
| OPERATION | $P_0$ | $P_0 >> 1 - P_{-1} >> 1$ | $P_0 >> 2 - P_{-1} >> 2$ |
| | $P_1 / P_2$ | $P_n >> 1 - P_0 >> 1$ | $P_n >> 2 - P_0 >> 2$ |
| | $P_3$ | $P_3 >> 1 - (P_1 >> 1 + P_2 >> 1)/2$ | $P_3 >> 2 - (P_1 >> 2 + P_2 >> 2)/2$ |
| DIFFERENCE RANGE | — | $-16 \sim 15$ | $-16 \sim 15$ |
| MAXIMUM ERROR (ORIGINAL→RECON.) | — | 1 | 2 |

FIG. 11

| ALLOCATION BIT | MODE | R/G | B |
|---|---|---|---|
| | 4 | 16/16 | 12 |
| OPERATION | $P_0$ | $P_0 >> 2 - P_{-1} >> 2$ | $P_0 >> 2 - P_{-1} >> 2$ |
| | $P_1 / P_2$ | $P_n >> 2 - P_0 >> 2$ | $P_n >> 2 - P_0 >> 2$ |
| | $P_3$ | $P_3 >> 2 - (P_1 >> 2 + P_2 >> 2)/2$ | $P_3 >> 2 - (P_1 >> 2 + P_2 >> 2)/2$ |
| DIFFERENCE RANGE | — | $-32 \sim 31$ | $-16 \sim 15$ |
| MAXIMUM ERROR (ORIGINAL→RECON.) | — | 2 | 2 |

FIG. 13

R  
MSB P0 P1 P2 P3

G  
MSB P0 P1 P2 P3

B  
MSB P0 P1 P2 P3

| | MODE | R/G | B |
|---|---|---|---|
| ALLOCATION BIT | 4 | 16/16 | 12 |
| OPERATION | $P_0$ | $P_0 >> 3 - P_{-1} >> 3$ | $P_0 >> 3 - P_{-1} >> 3$ |
| | $P_1 / P_2$ | $P_n >> 3 - P_0 >> 3$ | $P_n >> 3 - P_0 >> 3$ |
| | $P_3$ | $P_3 >> 3 - (P_1 >> 3 + P_2 >> 3)/2$ | $P_3 >> 3 - (P_1 >> 3 + P_2 >> 3)/2$ |
| DIFFERENCE RANGE | — | −64 ~ 63 | −32 ~ 31 |
| MAXIMUM ERROR (ORIGINAL→RECON.) | — | 4 | 4 |

| ALLOCATION BIT | MODE | R/G | B |
|---|---|---|---|
| | 4 | 16/16 | 12 |
| OPERATION | $P_0$ | $P_0 >> 3 - P_{-1} >> 3$ | $P_0 >> 4 - P_{-1} >> 4$ |
| | $P_1/P_2$ | $P_n >> 3 - P_0 >> 3$ | $P_n >> 4 - P_0 >> 4$ |
| | $P_3$ | $P_3 >> 3 - (P_1 >> 3 + P_2 >> 3)/2$ | $P_3 >> 4 - (P_1 >> 4 + P_2 >> 4)/2$ |
| DIFFERENCE RANGE | — | $-64 \sim 63$ | $-64 \sim 63$ |
| MAXIMUM ERROR (ORIGINAL→RECON.) | — | 4 | 8 |

METHOD, MEDIUM, AND SYSTEM COMPRESSING AND/OR RECONSTRUCTING IMAGE INFORMATION WITH LOW COMPLEXITY

CROSS-REFERENCE TO RELATED APPLICATIONS

This application is a continuation application of U.S. application Ser. No. 14/198,068, filed on May 5, 2014 in the U.S. Patent and Trademark Office, which is a continuation application of U.S. application Ser No. 11/890,496, filed on Aug. 7, 2007 in the U.S. Patent and Trademark Office, which claims the benefit of Korean Patent Application No. 10-2006-0077776, filed on Aug. 17, 2006, in the Korean Intellectual Property Office, the disclosure of each of which is incorporated herein in its entirety by reference.

BACKGROUND

1. Field

One or more embodiments of the present invention relate to a system for compressing and/or reconstructing images, and more particularly, to an image encoder/decoder system suitable for Liquid Crystal Display Dynamic Capacitance Compensation (LCD DCC) devices.

2. Description of the Related Art

FIG. 1 illustrates a portion of a conventional Liquid Crystal Display Dynamic Capacitance Compensation (LCD DCC) device.

Referring to FIG. 1, this conventional LCD DCC device includes a memory 11 and a Lookup Table (LUT) module 12. The LCD DCC device is used to apply a voltage higher than a required voltage to the pixels of a Thin Film Transistor (TFT)-LCD panel, in order to enhance the response time of the TFT-LCD panel. For example, if a current voltage of a pixel in the TFT-LCD panel is A and the following voltage of the pixel is B, the LCD DCC device applies the voltages to the pixel in the order of A→C→B (where C is a voltage higher than A or B) without applying the voltages to the pixel in the order of A→B. Hereinafter, a process in which a LCD DCC device calculates a voltage value for enhancing the response time of a TFT-LCD panel will be described, and then problems of such conventional techniques will be described.

Referring to FIG. 1, the memory 11 receives and stores information of a current picture. When the information of the current picture is received, information of the previous picture is already stored in the memory 11.

The LUT module 12 calculates a voltage value required to achieve a target response time of a TFT-LCD panel, with reference to a lookup table. In more detail, the LUT module 12 searches for voltage value information corresponding to a difference between the luminance value of a certain pixel of a currently received picture and the luminance value of the corresponding pixel of the previous picture stored in the memory 11, from the lookup table, and calculates a voltage value required to achieve the target response time of the TFT-LCD panel, using the voltage value information and information on the target response time of the TFT-LCD panel.

As described above, in order to calculate the voltage value required to achieve the target response time of the TFT-LCD panel, information of the previous picture must be stored in the memory 11. The higher the picture quality, the larger the amount of data of the picture. Accordingly, a variety of techniques for compression-storage of pictures in a memory have been proposed. Conventional image compression techniques include the JPEG (Joint Photographic Experts Group) standard, the H.264 (intra coding) standard, the JPEG-LS standard, etc. However, these standards have the following problems when they are applied to LCD DCC devices.

First, there is a picture quality problem that occurs. When image data is compressed to ½-⅓ the size of the original image data, according to any one of the above-mentioned image compression methods, no significant problems occur in view of objective picture quality, e.g., measured by a Peak Signal-to-Noise Ratio (PSNR). However, in the case of the JPEG or H.264 standard based on transform coding, subjective picture quality performance deteriorates. In particular, based on a phenomenon in which the edge portions of an image appear crushed, a subjective interpretation of video quality may be that picture quality has deteriorated along the edge portions. Since LCD DCC devices drive a TFT-LCD channel that is to be shown directly to people, such subjective picture quality tends to be more important than objective picture quality in compression codecs for LCD DCC. That is, the compression codecs for LCD DCC devices typically should provide high picture quality performance so that people should not recognize the differences between pixel values caused by image compression.

Another problem related to transform coding compression occurs when images shift in units of a pixel, e.g., with an object within the image moving, thereby shifting pixel values among neighboring pixels. Though there may be no apparent difference between an original image and its reconstructed image when the original image is shifted in a unit of each pixel, when an original image is transform coding compressed and reconstructed a slight difference between pixel values within the same particular block has substantial influence on the reconstructed image. Accordingly, when an image is shifted in a unit of a pixel and input to an LCD DCC device even a slight difference between pixel values will be easily recognized by users.

Second, since all of the above-mentioned image compression techniques are based on entropy coding, a critical path happens when images are decoded, and accordingly the complexity of a decoder significantly increases. Here, "critical path" means the longest process path among process paths that must be concurrently performed to complete all required processes. That is, "critical path" means a path requiring the longest process time among all process paths. In particular, in the case of the JPEG and H.264 standards that perform transform coding in a unit of a block, the complexity of a decoder further increases. Furthermore, since the H.264 standard uses intra prediction, the amount of memory use increases and the complexity of a decoder further increases.

Third, all of the above-mentioned image compression techniques allow bit rate control to some degree, however, they cannot generate an exact bit rate. For example, when the above-mentioned image compression techniques control a bit rate to achieve ½ compression, the bit rate will be limited within ½ compression due to the capacity limitation of a memory used in the corresponding LCD DCC device. If bit rate control is successfully performed according to one of the above-mentioned image compression techniques, the amount of data is generated at a ½ compression rate. However, if bit rate control fails, the amount of data may be generated at a compression rate lower than the ½ compression rate. Therefore, the above-mentioned techniques are not suitable for image compression for LCD DCC devices which uses a fixed capacity of a memory.

SUMMARY

One or more embodiments of the present invention provide a system, medium, and method enhancing subjective picture quality, thereby significantly lowering the complexity of an image encoder/decoder system, and providing a picture-based Control Bit Rate (CBR) suitable for a Liquid Crystal Display Dynamic Capacitance Compensation (LCD DCC) device, when images are reconstructed.

Additional aspects and/or advantages of the invention will be set forth in part in the description which follows and, in part, will be apparent from the description, or may be learned by practice of the invention.

To achieve the above and/or other aspects and advantages, embodiments of the present invention include a data compression method, including selecting a mode from among a plurality of modes for compressing current data, according to predetermined criteria, and selectively, according to the selected mode, performing at least one of a calculating of a difference between the current data and reference data and truncating a portion of the current data, and selectively compressing the current data according to the calculated difference and/or the truncated portion of the current data.

To achieve the above and/or other aspects and advantages, embodiments of the present invention include a system with data compression, including a selection unit selecting a mode from among a plurality of modes for compressing current data, according to predetermined criteria, a first encoding unit to selectively calculate a difference between the current data and reference data, according to the selected mode, and a second encoding unit to selectively truncate a portion of the current data, and an output unit to selectively combine encoded current data from the first encoding unit and the second encoding unit based upon the calculated difference and/or compressed current data based upon the truncated portion of the current data.

To achieve the above and/or other aspects and advantages, embodiments of the present invention include a data reconstruction method to reconstruct compressed current data compressed according to a mode, from among a plurality of modes, the method including identifying the mode, from among the plurality of modes, for reconstructing the current data, and selectively, according to the identified mode, performing at least one of an adding of reference data to compressed data of the current data, when the compressed data of the current data represents a difference between the current data and the reference data, and adding a predetermined binary value to the compressed data of the current data, when the compressed data of the current data corresponds to truncation of the current data, reconstructing the current data based upon the adding of the reference data to the compressed data of the current data and/or the adding of the predetermined binary value to the compressed data of the current data.

To achieve the above and/or other aspects and advantages, embodiments of the present invention include a system with data reconstruction to reconstruct compressed current data compressed according to a mode, from among a plurality of modes, the system including an identifying unit to identify the mode, from among the plurality of modes, for reconstructing the current data, a first decoding unit to selectively add reference data to compressed data of the current data, when the compressed data of the current data represents a difference between the current data and the reference data, a second decoding unit to selectively add a predetermined binary value to the compressed data of the current data, when the compressed data of the current data corresponds to truncation of the current data, and an output unit to reconstruct the current data based upon the adding of the reference data to the compressed data of the current data and/or the adding of the predetermined binary value to the compressed data of the current data.

To achieve the above and/or other aspects and advantages, embodiments of the present invention include a data compression/reconstruction method, including selectively, according to a selected mode of a plurality of modes, performing at least one of a calculating of a difference between current data and reference data and truncating a portion of the current data, and selectively compressing the current data according to the calculated difference and/or the truncated portion of the current data, storing the compressed current data, and selectively adding at least one of the reference data or a predetermined binary value to the compressed current data, based on the selected mode, and reconstructing the current data.

To achieve the above and/or other aspects and advantages, embodiments of the present invention include a data compression/reconstruction system including a compression unit to selectively, according to a selected mode of a plurality of modes, performing at least one of a calculating of a difference between current data and reference data and truncating a portion of the current data, and selectively compressing the current data according to the calculated difference and/or the truncated portion of the current data, a memory storing the compressed current data, and a reconstruction unit to selectively add at least one of the reference data or a predetermined binary value to the compressed current data, based on the selected mode, and reconstructing the current data.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a view for explaining a zero mode in which a data compression system, such as that illustrated in FIG. 6, compresses data without shifting the bits of any color components, according to an embodiment of the present invention;

FIG. 8 is a view for explaining a first mode in which a data compression system, such as that illustrated in FIG. 6, compresses data after shifting the bits of a B color component by 1 bit without shifting the bits of R and G color components, according to an embodiment of the present invention;

FIG. 10 is a view for explaining a third mode in which a data compression system, such as that illustrated in FIG. 6, compresses data after shifting R and G color components respectively by 1 bit and shifting a B color component by 2 bits, according to an embodiment of the present invention;

FIG. 11 is a view for explaining a fourth mode in which a data compression system, such as that illustrated in FIG. 6, compresses data after shifting all color components respectively by 2 bits, according to an embodiment of the present invention;

FIG. 13 is a view for explaining a sixth mode in which a data compression system, such as that illustrated in FIG. 6, compresses data after shifting all color components respectively by 3 bits, according to an embodiment of the present invention;

DETAILED DESCRIPTION

Figure 1:
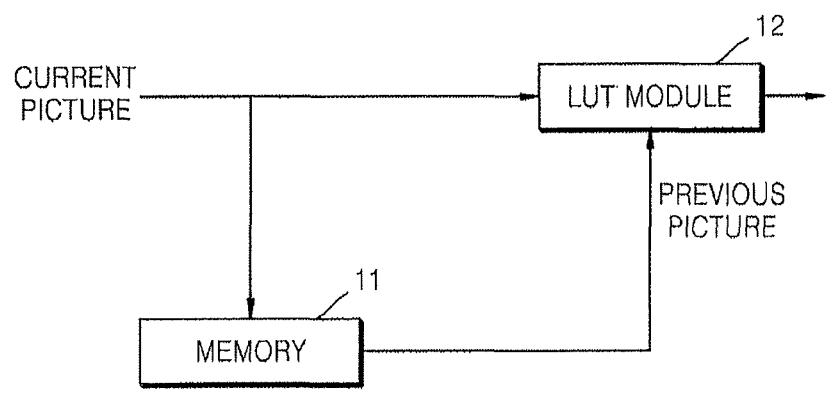
FIG. 1 illustrates a portion of a conventional Liquid Crystal Display Dynamic Capacitance Compensation (LCD DCC) device.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
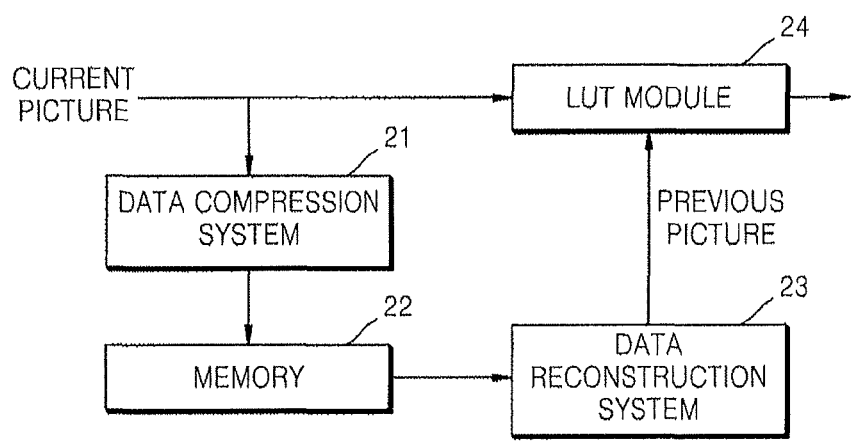
FIG. 2 illustrates a portion of a LCD DCC device/system, according to an embodiment of the present invention.

FIG. 2 illustrates a portion of a Liquid Crystal Display Dynamic Capacitance Compensation (LCD DCC) device/system according to an embodiment of the present invention.

Referring to FIG. 2, the LCD DCC device includes a data compression system 21, a memory 22, a data reconstruction system 23, and a LUT 24, for example.

The data compression system 21 may compress data, e.g., using one of two data compression methods, that is, a Differential Pulse Code Modulation (DPCM) method and a Pulse Code Modulation (PCM) method, for example.

The memory 22 may receive and store the compressed data from the data compression system 21. By performing this operation, when a current picture is received, the previous picture may already be stored in the memory 22.

The data reconstruction system 23 may reconstruct data using one of the two data compression methods, that is, the DPCM method and the PCM method, for example.

The LUT module 24 may calculate a voltage value required to achieve a target response time of a TFT-LCD panel, with reference to a lookup table. In more detail, the LUT module 24 may search the lookup table for voltage value information corresponding to a difference between the luminance value of a certain pixel in the currently received picture and the luminance value of the corresponding pixel in the previous picture, e.g., as reconstructed by the data reconstruction system 23, and calculate the voltage value required to achieve the target response time of the TFT-LCD panel, using the voltage value information and the target response time of the TFT-LCD panel.

Figure 3:
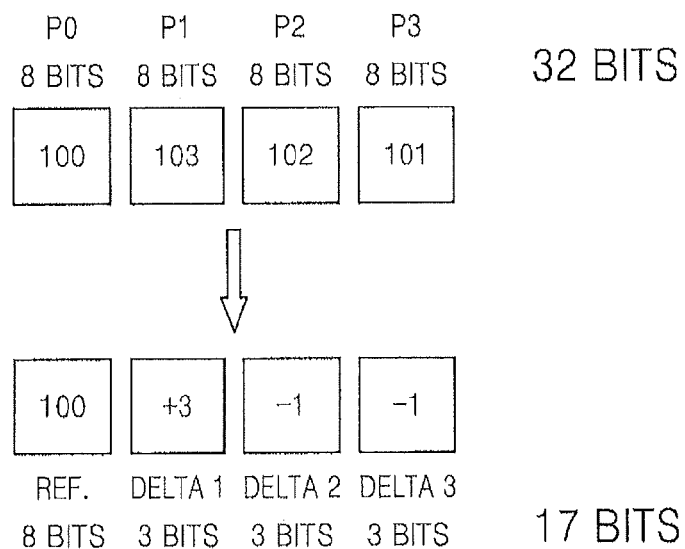
FIG. 3 is a view for explaining an example to which a Differential Pulse Code Modulation (DPCM) method performed by a data compression system, such as that illustrated in FIG. 2, is applied, according to an embodiment of the present invention.

FIG. 3 is a view for explaining an example in which a DPCM method is performed by the data compression system 21, for example.

Referring to FIG. 3, the data compression system 21 may calculate a difference between current image data and reference data, using the DPCM method, and compress the current image data based on the calculated difference. In particular, in the example illustrated in FIG. 3, 32 bits corresponding to 4 pixels are compressed to 17 bits.

Figure 4:
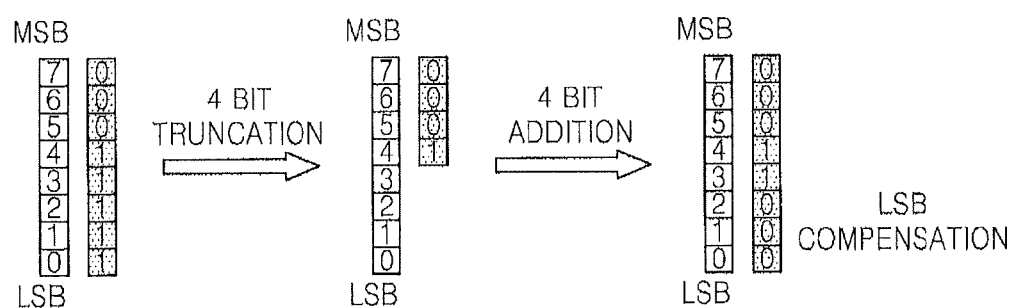
FIG. 4 is a view for explaining an example to which a Pulse Code Modulation (PCM) method performed by a data compression system, such as that illustrated in FIG. 2, is applied.

FIG. 4 is a view for explaining an example in which a PCM method is performed by the data compression system 21, for example.

Referring to FIG. 4, the data compression system 21 may merely truncate a portion of current image data, using the PCM method, to compress the current image data. In particular, in the example illustrated in FIG. 4, the lower 4 bits of original data 31 (00011111) are truncated. The lower 4 bits (that is, "1000") will be added when the original data is reconstructed, so that data representing a value of 24 (00011000) is reconstructed. Herein, the term "PCM method" is used to explain a technical concept that is different from the "DPCM" method, and may also, for example, further be different from the technical concept of a typical PCM method of converting analog signals into digital signals. Thus, alternative terms can be used for this PCM method described herein, e.g., a truncation compression method, noting that alternatives are equally available.

From the above descriptions, it should be understood that the DPCM and PCM methods, which may be used by the data compression system 21 and the data reconstruction system 23, for example, can have very low complexity compared to conventional image compression methods, such as JPEG, H.264, and JPEG-LS standards. In particular, in an embodiment, by using the DPCM and PCM methods, for example, data can be easily compressed by a constant amount. According one embodiment, a constant bit rate required by LCD DCC devices/systems can be exactly achieved.

Figure 5:
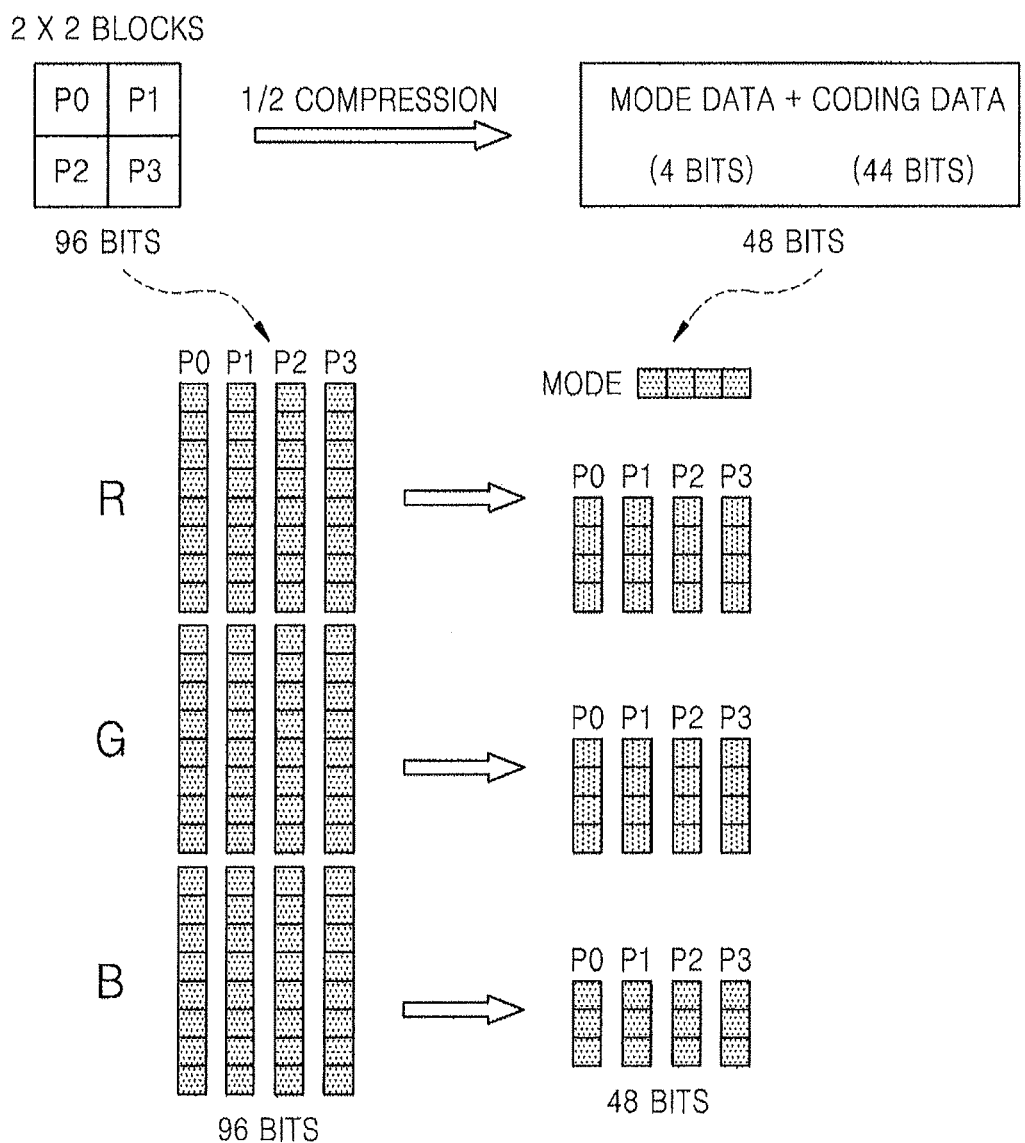
FIG. 5 illustrates a data format compressed by a data compression system, such as that illustrated in FIG. 2, according to an embodiment of the present invention.

FIG. 5 illustrates a data format compressed by a data compression system, such as system 21 illustrated in FIG. 2, according to an embodiment of the present invention.

Below, and further herein, the reference to the data compression system 21 is used only as an example, and alternative data compression systems are equally available.

Referring to FIG. 5, the data compression system 21 may ½ compress 96 bits of image data, for example, corresponding to a 2×2 size block (hereinafter, simply referred to as a "2×2 block") made up of 4 pixels P0, P1, P2, and P3, thereby generating 48 bits of compressed data. Here, each pixel of the 2×2 block includes 8 bits of current image data corresponding to a Red (R) component, 8 bits of current image data corresponding to a Green (G) component, and 8 bits of current image data corresponding to a Blue (B) component, for example. Accordingly, in this example, each pixel data is represented by 24 bits, and the overall 2×2 block is represented by 96 bits.

The data compression system 21 may compress the 2×2 block to 4 bits of mode data and 44 bits of compressed data. In more detail, 4 bits may be assigned to the 8 bits corresponding to the R component of each pixel, 4 bits may be assigned to the 8 bits corresponding to the G component of each pixel, and 3 bits may be assigned to the 8 bits corresponding to the B component of each pixel, again noting that alternative embodiments are equally available. In order to achieve an exact ½ compression rate of the 96 bits, 4 bits may be assigned to the mode data, and 3 bits may be assigned to the B component of each pixel, as illustrated in FIG. 5.

As described above, in this embodiment, since the DPCM or PCM compression methods with 2×2 blocks are used, it is possible to minimize picture quality deterioration when images shift, compared to conventional image compression methods in which images are compressed in a unit of 16×16 macroblocks or 8×8 blocks. That is, since this embodiment compresses and/or reconstructs images in units of very small pieces, e.g., the 2×2 blocks, compared to the conventional methods, a slight difference between the values of pixels within a block does not substantially influence the result obtained by compressing and reconstructing the corresponding image. Accordingly, this embodiment can significantly enhance subjective picture quality performance.

Embodiments of the present invention can be widely applied to image compression fields requiring low complexity and subjective lossless picture quality, other than the above-mentioned LCD DCC device/system illustrated in FIG. 2. For example, embodiments may be applied to image compression for Display Driver IC (DDI), reference picture compression of an image encoder/decoder system, etc.

Figure 6:
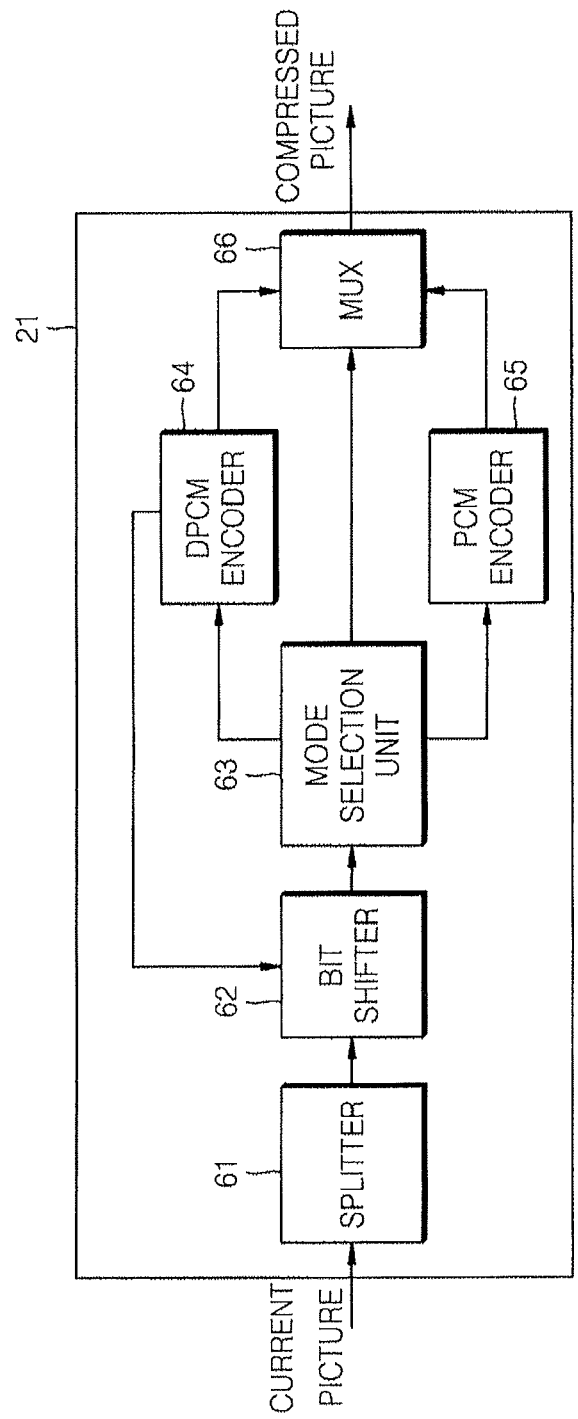
FIG. 6 illustrates a data compression system, such as that illustrated in FIG. 2, according to an embodiment of the present invention.

FIG. 6 illustrates data compression system, again such as the data compression system 21 illustrated in FIG. 2, according to an embodiment of the present invention.

Referring to FIG. 6, the data compression system 21 may include a splitter 61, a bit shifter 62, a mode selection unit 63, a DPCM encoder 64, a PCM encoder 65, and a MUX 66, for example.

The splitter 61 may receive a current picture, divide the current picture into units of 2×2 blocks as illustrated in FIG. 5, and output at least one divided 2×2 block to the bit shifter 62, for example.

The bit shifter 62 may also receive a 2×2 block from the DPCM encoder 64, shift 8 bits of current image data corresponding to each color component of each pixel of the 2×2 block, and 8 bits of reference image data corresponding to the 8 bits of current image data, in a unit of 1 bit, in a direction to the right, and output the result of the bit-shifting to the mode selection unit 63. In addition, whenever the bit shifter 62 shifts the current image data in a unit of 1 bit to the right, the bit shifter 62 may increase the indicated number of bit-shifting operations of the current image data by "1". Here, the bit shifter 62 may also receive the current image data corresponding to a 2×2 block from the splitter 61 and output the current image data to the DPCM encoder 64, without bit-shifting, in which case, the bit shifter 62 may set the indicated number of bit-shifting operations of the current image data to "0".

Thus, the current image data received from the DPCM encoder 64 may not be shifted by the bit shifter 92, or may be shifted at least once by the bit shifter 62. In addition, the reference image data may be image data of one pixel from among pixels adjacent to a pixel corresponding to the current image data. The reference image data may be image data which is most closely matched with the current image data, among image data corresponding to the adjacent pixels. In one embodiment, it is assumed that a reference pixel of a pixel P0 is a pixel P−1, a reference pixel of a pixel P1 is a pixel P0, a reference pixel of a pixel P2 is a pixel P0, and a reference pixel of a pixel P3 is the average value of the pixel P1 and the pixel P2. The pixel P−1 may be one pixel from among the adjacent pixels of the pixels P0, P1, P2, and P3, for example.

In addition, the shifting the 8 bits of current image data and the 8 bits of reference image data in the unit of 1 bit to the right means shifting the current image data in the unit of 1 bit toward the Least Significant Bit (LSB) side. Accordingly, such shifting by the unit of 1 bit is equivalent to dividing the 8 bits of a current image data value by 2 and dividing the 8 bits of a reference image data value by 2.

The mode selection unit 63 may select a mode, from among a plurality of modes which can compress the current image data, on the basis of the number of the bit-shifting operations of the 8 bits of current image data corresponding to each color component of each pixel of the 2×2 block received from the bit shifter 62. In more detail, if the number of the bit-shifting operations of the 8 bits of current image data does not exceed 4 when the color component is a R or G component, or if the number of the bit-shifting operations does not exceed 3 when the color component is a B component, the mode selection unit 63 may select a DPCM encoding mode corresponding to the number of the bit-shifting operations, from among a plurality of DPCM encoding modes, and output the 8 bits of current image data bit-shifted by the number of the bit-shifting operations to the DPCM encoder 64. If the number of the bit-shifting operations of the 8 bits of current image data exceeds 4 when the color component is an R or G component, or if the number of the bit-shifting operations exceeds 3 when the color component is a B component, the mode selection unit 63 may select a PCM encoding mode, and output the 8 bits of current image data to the PCM encoder 65 without bit-shifting, e.g., for merely truncation of the image data. In this example, the current image data output to the PCM encoding unit 65 by the mode selection unit 63 is a value that is not bit-shifted. When the color component is an R or G component, the current image data may be a value which is bit-shifted 4 times. When the color component is a B component, the current image data may be a value that is bit-shifted 3 times. In one embodiment, as described herein, 12 encoding modes are provided, noting that alternatives are equally available. These 12 encoding modes will be described in further detail below with reference to FIGS. 7 through 18.

The DPCM encoder 64 may calculate a difference between the 8 bits of current image data corresponding to each color component of each pixel of the 2×2 block received from the mode selection unit 63, and the 8 bits of reference image data corresponding to the 8 bits of current image data, according to a mode selected by the mode selection unit 63, to compress the current image data. In more detail, in this embodiment, if the mode selected by the mode selection unit 63 is a DPCM encoding mode, the DPCM encoding unit 64 may, thus, calculate a difference between the 8 bits of current image data and the 8 bits of reference image data, and determine whether the difference can be represented by bits of a constant length, for example. Successively, if the difference can be represented by bits of a constant length, the DPCM encoder 64 may output the difference as compressed data of the current image data to the MUX 66. In this embodiment, if the difference cannot be represented by bits of a constant length, the DPCM encoder 64 may output the 8 bits of current image data directly to the bit shifter 62.

According to the data compression format illustrated in FIG. 5, for example, the bits of constant length among the 8 bits of current image data corresponding to the R or G component become 4 bits, and the bits of constant length among the 8 bits of current image data corresponding to the B component become 3 bits. That is, the DPCM encoder 64 may calculate the difference between the 8 bits of current image data corresponding to the R or G component received from the mode selection unit 63, and the 8 bits of reference image data corresponding to the current image data, and determines whether the difference is in a range of −8 to 7, i.e., whether the difference can be represented by 4 bits. Then, if the difference is in the range of −8 to 7, the DPCM encoder 64 may output the difference as compressed data of the current image data to the MUX 66. If the difference is not in the range of −8 to 7, the DPCM encoder 64 may output the 8 bits of current image data to the bit shifter 62, and the 8 bits of current image data may be bit-shifted. In this embodiment, bit-shifting may be repeatedly performed until the difference between the 8 bits of current image data corresponding to the R or G component and the reference image data corresponding to the current image data can be represented by 4 bits, Alternatively, if the difference cannot be represented by 4 bits, the PCM encoder 65 may merely truncate 4 bits of the 8 bits of current image data corresponding to the color component of the pixel of the 2×2 block received from the mode selection unit 63, according to the mode selected by the mode selection unit 63, to compress the current image data. In more detail, if the mode selected by the mode selection unit 65 is a PCM encoding mode, the PCM encoder 65 may truncate the lower 4 bits of the 8 bits of current image data corresponding to the color component of each pixel of the 2×2 block received from the mode selection unit 63, and output the remaining 4 bits of the current image data as the compressed data of the current image data to the MUX 66.

The MUX 66 thereafter multiplexes the 4 bits of mode data representing the mode selected by the mode selection unit 63, with a total of 44 bits of the compressed data received from the DPCM encoder 64 and/or the compressed data received from the PCM encoder 65, and may further store 48 bits of data in the memory 22.

FIG. 7 is a view for explaining a mode 0 in which the data compression system 21, for example, illustrated in FIG. 6, compresses data without shifting bits of any color components.

Referring to FIG. 7, in this mode, 8 bits of current image data input to the DPCM encoder 64 have not been subjected to bit-shifting by the bit shifter 62, regardless of the type of color component of the 8 bits of current image data.

In this case, the DPCM encoder 64 calculates a difference between 8 bits of current image data corresponding to the R component of a pixel P0 received from the mode selection unit 63 and 8 bits of reference image data corresponding to the R component of a pixel P−1. If the difference can be represented by 4 bits, that is, if the difference is in a range of −8 to 7, the DPCM encoder 64 outputs the difference as 4 bits of compressed data to the MUX 66. However, if the difference is not in the range of −8 to 7, i.e., if the difference cannot be represented by 4 bits, the DPCM encoder 64 may output the 8 bits of current image data corresponding to the R component of the pixel P0 received from the mode selection unit 63, to the bit shifter 62. In addition, the DPCM encoder 64 may process 8 bits of current image data corresponding to the G component of the pixel P0 received from the bit shifter 62, in the same way as the processing of the R component.

In addition, the DPCM encoder 64 may calculate a difference between 8 bits of current image data corresponding to the B component of the pixel P0 received from the mode selection unit 63 and 8 bits of reference image data corresponding to the B component of the pixel P−1. If the difference can be represented by 3 bits, that is, if the difference is in a range of −4 to 3, the DPCM encoder 64 may output the difference as 3 bits of compressed data. If the difference is not in the range of −4 to 3, i.e., the difference cannot be represented by 3 bits, the DPCM encoder 64 may output the 8 bits of current image data corresponding to the B component of the pixel P0 received from the mode selection unit 63, back to the bit shifter 62.

The DPCM encoder 64 may process pixels P1, P2, and P3 received from the mode selection unit 63 in a similar manner as the processing of the pixel P0, for example.

FIG. 8 is a view for explaining a mode 1 in which the data compression system 21, for example, illustrated in FIG. 6, compresses data after shifting the bits of a B color component by 1 bit without shifting the bits of R and G color components.

Thus, referring to FIG. 8, 8 bits of current image data for the R and G components input to the DPCM encoder 64 may not have been subjected to bit-shifting by the bit shifter 62, while the 8 bits of current data of the B component may have been subjected to bit-shifting of 1 bit by the bit shifter 62.

In this case, if the 8 bits of current data is an R or G component, the DPCM encoder 64 may process the R or G component in a similar way as the processing described above with reference to FIG. 7, for example. If 8 bits of current image data, shifted by 1 bit, corresponding to the B component of a pixel P0, is received from the mode selection unit 63, the DPCM encoder 64 may calculate a difference between the 8 bits of current image data and reference image data shifted by 1 bit, corresponding to the B component of a pixel P−1. If the difference can be represented by 3 bits, that is, if the difference is in a range of −4 to 3, the DPCM encoder 64 may output the difference as 3 bits of compressed data. If the difference is not in the range of −4 to 3, the DPCM encoder may 64 output the 8 bits of current image data corresponding to the B component of the pixel P0 received from the mode selection unit 63, back to the bit shifter 62. Here, that the difference between the current image data shifted by 1 bit and the reference image data shifted by 1 bit is in the range of −4 to 3, means that a difference between original current image data not bit-shifted and original reference image data not bit-shifted is in a range of −8 to 7. As such, when the 8 bits of current image data corresponding to the B component is shifted by 1 bit to the right, the bit LSB 1 of the 8 bits of current image data is not considered when the current image data is compressed. If the bit LSB 1 of the 8 bits of current image data is unconditionally set to a binary value "1" when the current image data is reconstructed, a maximum error between the original data value and its reconstructed data value becomes "1".

In addition, the DPCM encoder 64 may process pixels P1, P2, and P3 received from the mode selection unit 63, in a similar manner as the processing of the pixel P0.

Figure 9:
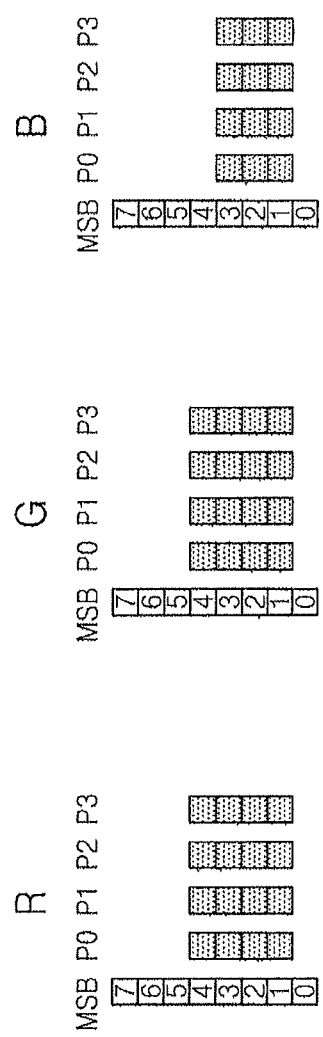
FIG. 9 is a view for explaining a second mode in which a data compression system, such as that illustrated in FIG. 6, compresses data after shifting all color components respectively by 1 bit, according to an embodiment of the present invention.

FIG. 9 is a view for explaining a mode 2 in which the data compression system 21, for example, illustrated in FIG. 6, compresses data after bit-shifting all color components by 1 bit.

Referring to FIG. 9, 8 bits of current image data input to the DPCM encoder 64 have been subjected to bit-shifting of 1 bit by the bit shifter 62, regardless of the type of color component of the 8 bits of current image data.

In this case, if the 8 bits of current image data is a B component, the DPCM encoder 64 may process the B component in a similar manner as the processing illustrated above with reference to FIG. 8. If the 8 bits of current image data is the R component of a pixel P0 received from the mode selection unit 63, the DPCM encoder 64 may calculate a difference between the current image data, and reference image data shifted by 1 bit, corresponding to the R component of a pixel P−1. If the difference can be represented by 4 bits, that is, if the difference is in a range of −8 to 7, the DPCM encoder 64 may output the difference as 3 bits of compressed data. If the difference is not in the range of −8 to 7, the DPCM encoder 64 may output the 8 bits of current image data corresponding to the R component of the pixel P0, back to the bit shifter 62. Here, that the difference between the current image data shifted by 1 bit and the reference image data shifted by 1 bit is in the range of −7 to 8, means that a difference between original current image data not bit-shifted and original reference image data not bit-shifted is in a range of −16 to 15. As such, when the 8 bits of current image data corresponding to the R component is shifted by 1 bit in the right direction, the bit LSB 1 of the 8 bits of current image data is not considered when the current image data is compressed. If the bit LSB 1 of the 8 bits of current image data is unconditionally set to a binary value "1" when the current image data is reconstructed, a maximum error between the original data value and the reconstructed data value becomes "1".

In addition, if 8 bits of current image data of a pixel P0 received from the mode selection unit 63 is a G component, the DPCM encoder 64 may process the G component, in a similar manner as the processing of the R component. Further, the DPCM encoder 64 may process pixels P1, P2, and P3 received from the mode selection unit 63, in a similar manner as the processing of the pixel P0.

FIG. 10 is a view for explaining a mode 3 in which the data compression system 21, for example, illustrated in FIG. 6, compresses data after shifting R and G color components by 1 bit, respectively, and shifting a B color component by 2 bits. The mode 3 illustrated in FIG. 10 has a different number of bit shifting operations, from the modes 0, 1, and 2 illustrated in FIGS. 7, 8, and 9. However, the mode 3 derives from the same technical concept as the above-described modes 0, 1, and 2 illustrated in FIGS. 7, 8, and 9, and therefore a detailed description thereof will be further omitted. If 8 bits of current image data corresponding to a B component is shifted by 2 bits to the right, the lower 2 bits of the 8 bits of current image data are not considered when the current image data is compressed. If the lower 2 bits of the 8 bits of current image data are unconditionally set to a binary value "10" when the current image data is reconstructed, a maximum error between the original data value and the reconstructed data value becomes "2".

FIG. 11 is a view for explaining a mode 4 in which the data compression system 21, for example, illustrated in FIG. 6, compresses data after shifting all color components by 2 bits, respectively.

Figure 12:
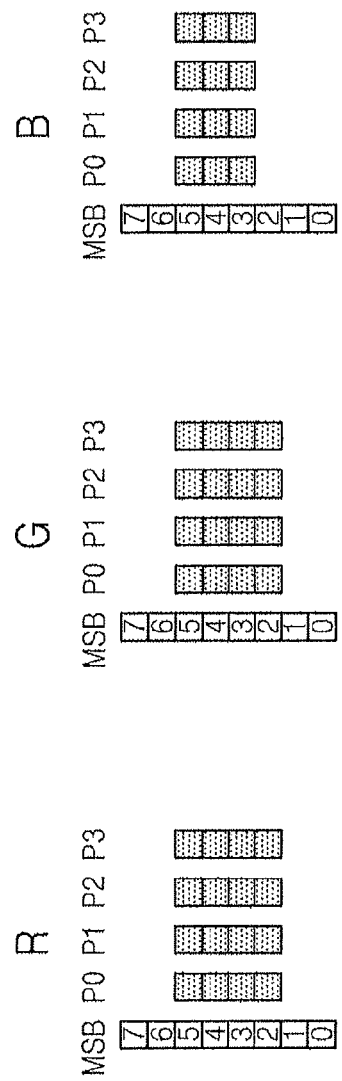
FIG. 12 is a view for explaining a fifth mode in which a data compression system, such as that illustrated in FIG. 6, compresses data after shifting R and G color components respectively by 2 bits and shifting a B color component by 3 bits, according to an embodiment of the present invention.

FIG. 12 is a view for explaining a mode 5 in which the data compression system 21, for example, illustrated in FIG. 6, compresses data after shifting R and G color components by 2 bits, respectively, and shifting a B color component by 3 bits.

FIG. 13 is a view for explaining a mode 6 in which the data compression system 21, for example, illustrated in FIG. 6, compresses data after shifting all color components by 3 bits.

Figure 14:
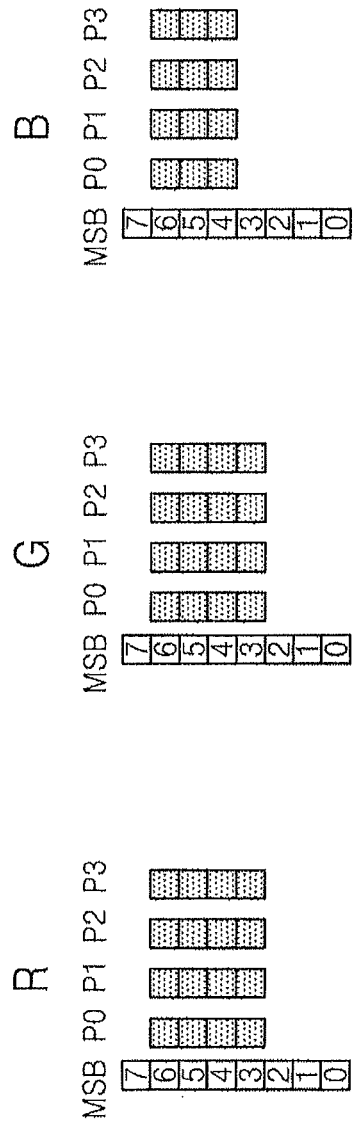
FIG. 14 is a view for explaining a seventh mode in which a data compression system, such as that illustrated in FIG. 6, compresses data after shifting R and G color components respectively by 3 bits and shifting a B color component by 4 bits, according to an embodiment of the present invention.

FIG. 14 is a view for explaining a mode 7 in which the data compression system 21, for example, illustrated in FIG. 6 compresses data after shifting R and G color components by 3 bits, respectively, and shifting a B color component by 4 bits.

The modes 4 through 7 illustrated in FIGS. 11 through 14 have different numbers of bit shifting operations, from the modes 0 through 3 illustrated in FIGS. 7 through 10 However, the modes 4 through 7 derive from the same technical concept as the above-described modes 0 through 3 illustrated in FIGS. 7 through 10, and therefore further detailed descriptions thereof will be omitted.

Figure 15:
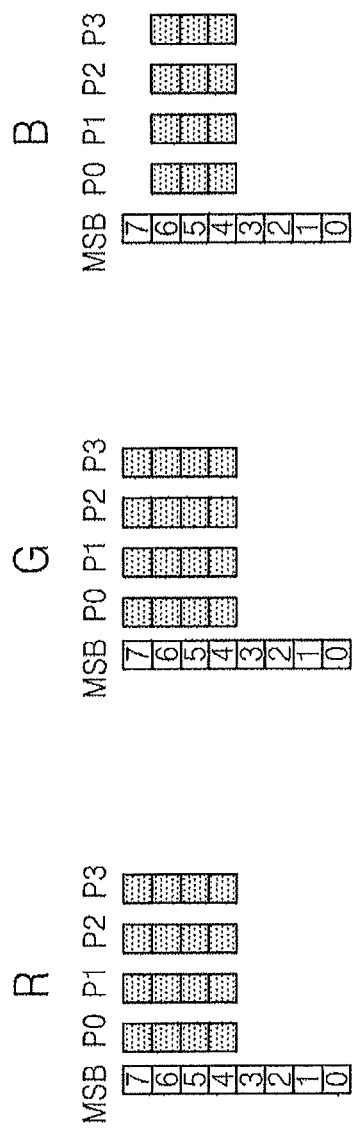
FIGS. 15, 16, and 17 are views for explaining eighth, ninth, and tenth modes in which a data compression system, such as that illustrated in FIG. 6, compresses data after shifting all color components respectively by 4 bits.
Figure 16:
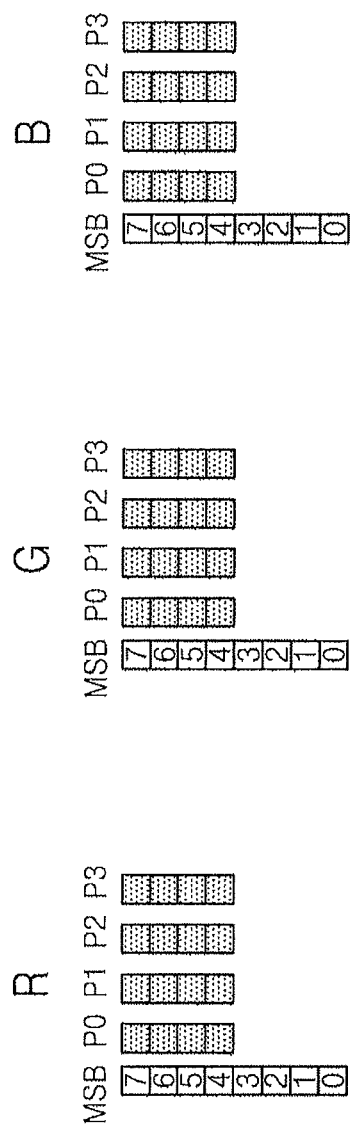
Figure 17:
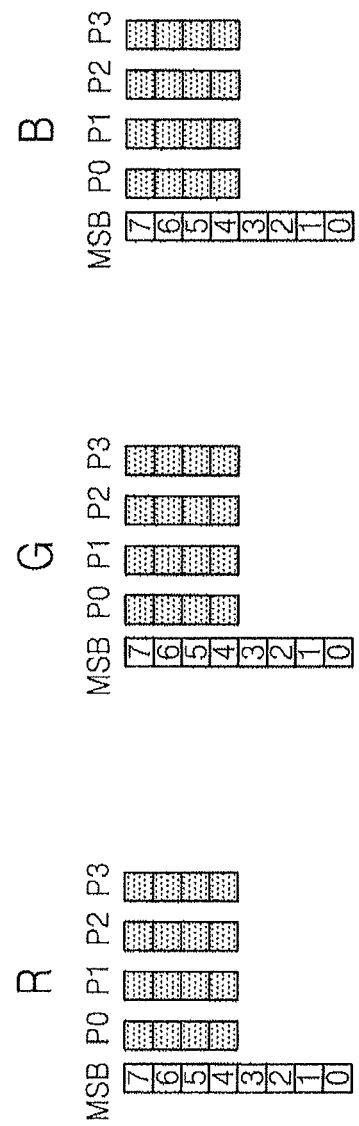

FIGS. 15, 16, and 17 are views for explaining modes 8, 9, and 10 in which the data compression system 21, for example, illustrated in FIG. 6, compresses data after shifting all color components by 4 bits, respectively.

In particular, in the mode 8 illustrated in FIG. 15, the data compression system 21 may compress data using the PCM method with respect to R and G components, and compresses data using the DPCM method with respect to a B component. By applying the DPCM method after shifting 8 bits of current image data by 4 bits to the right, the lower 4 bits of the current image data are not considered when the current image data is compressed. Likewise, in the case of the PCM method, since the lower 4 bits of current image data are not considered, an error between an original data value and its reconstructed data value is not reduced although the DPCM method is used if the number of bit shifting operations is 4 or more. Accordingly, in this embodiment, if the number of bit shifting operations is 4 or more, the PCM method having an amount of calculations much less than that of the DPCM method is used.

Further, in the mode 9 illustrated in FIG. 16, the data compression system 21 may compress data using the PCM method with respect to R, G, and B components. In particular, in FIG. 16, the data compression system 21 may extend the size of compressed data corresponding to a B component to 4 bits, and unconditionally set the MSB (Most Significant Bit) of the compressed data to a binary value "0". Accordingly, the value of the current image data corresponding to the B component becomes equal to or smaller than 128.

In the mode 10 illustrated in FIG. 17, the data compression system 21, for example, may compress data using the PCM method with respect to R, G, and B components. In particular, in FIG. 17, the data compression system 21 may extend the size of compressed data corresponding to a B component to 4 bits, and unconditionally set the MSB (Most Significant Bit) of the compressed data to a binary value "1". Accordingly, here, the value of the current image data corresponding to the B component must be greater than 128.

Figure 18:
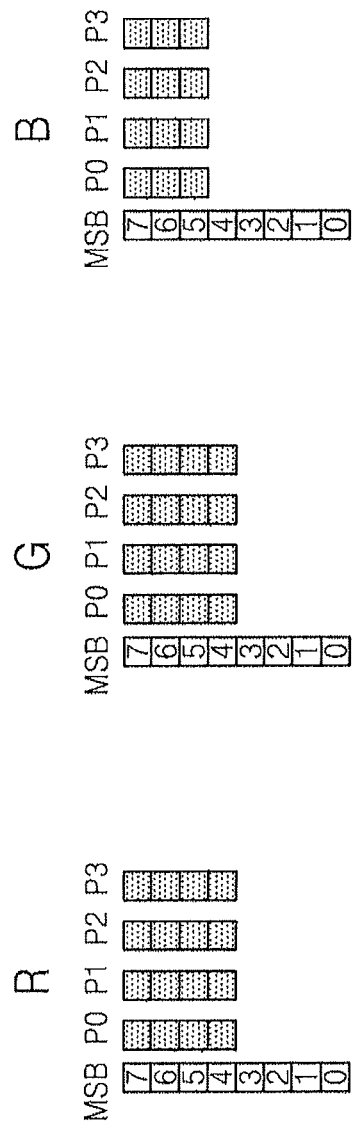
FIG. 18 is a view for explaining an eleventh mode in which a data compression system, such as that illustrated in FIG. 6, compresses data after shifting R and G color components respectively by 4 bits and shifting a B color component by 5 bits, according to an embodiment of the present invention.

FIG. 18 is a view for explaining a mode 11 in which the data compression system 21, for example, illustrated in FIG. 6, compresses data after shifting R and G color components by 4 bits, respectively, and shifting a B color component by 5 bits. In the embodiment shown in FIG. 18, the data compression system 21 compresses data using the PCM method with respect to R, G, and B components. In particular, in FIG. 18, the data compression system 21 sets the size of compressed data corresponding to a B component to 3 bits. Accordingly, when data is compressed, the lower 5 bits of the data are not considered. When the data is reconstructed, if the lower 5 bits of the data is set to a binary value "10000", a maximum error between the original data value and its reconstructed data value becomes "16".

Figure 19:
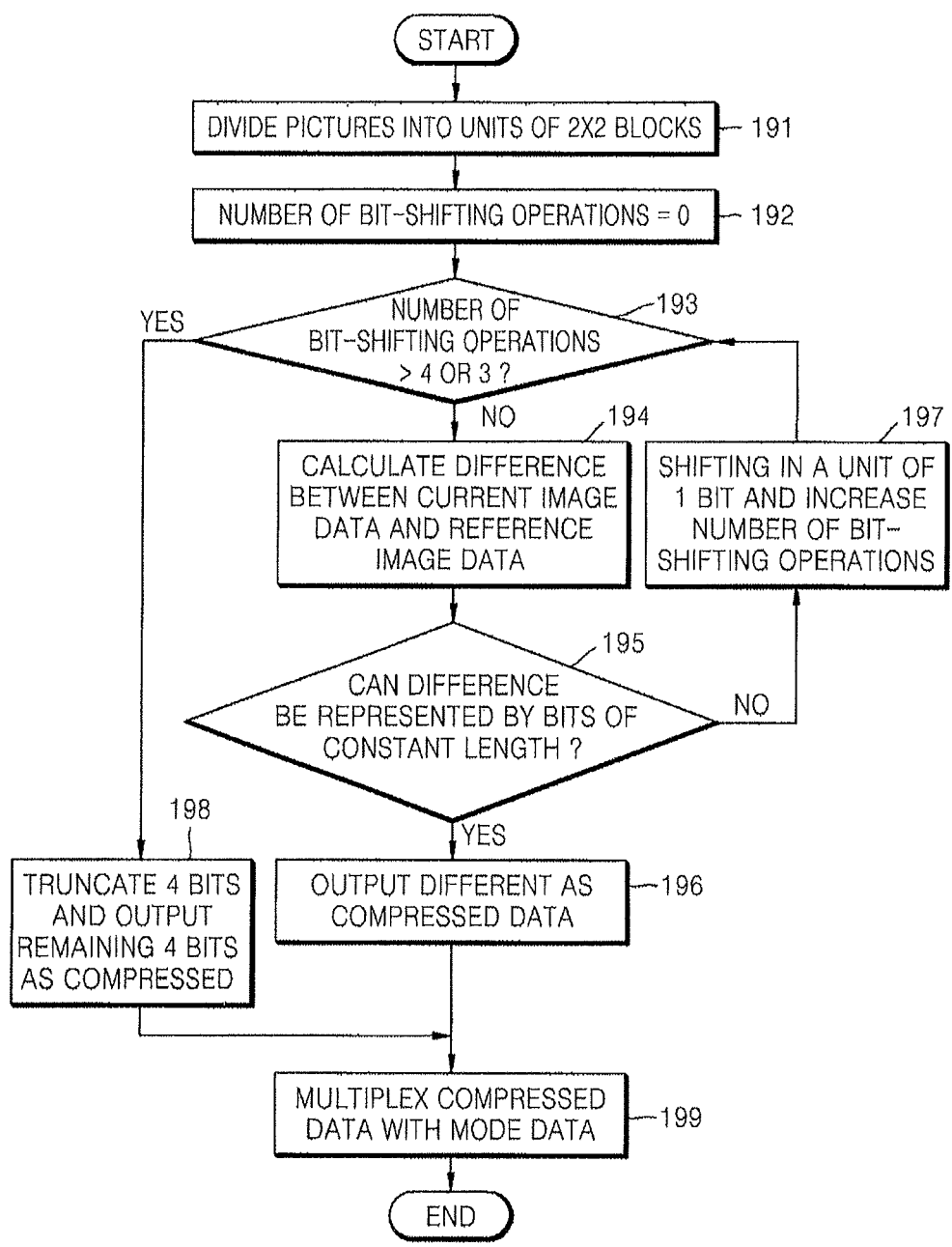
FIG. 19 illustrates a data compression method, according to an embodiment of the present invention.

FIG. 19 illustrates a data compression method, according to an embodiment of the present invention.

Referring to FIG. 19, the data compression method may include operations that are sequentially processed by the data compression system 21, for example, illustrated in FIG. 6. Accordingly, the above descriptions about the data compression system 21 illustrated in FIG. 6 may similarly be applied to the data compression method.

In operation 191, a picture may be received and divided into units of 2×2 blocks, e.g., as illustrated in FIG. 5.

In operation 192, the indicated number of shifting operations that are to be applied to current image data corresponding to the 2×2 blocks in operation 191, may be set to "0".

In operation 193, if the number of bit shifting operations applied to 8 bits of current image data corresponding to a certain color component of a certain pixel of a 2×2 block is 4 or less when the color component is a R or G component, and is 3 or less when the color component is a B component, the process may proceed to operation 194. If the number of the bit shifting operations exceeds 4 when the color component is an R or G component or exceeds 3 when the color component is a B component, the process may proceed to operation 198.

In operation 194 a difference between the 8 bits of current image data corresponding to the color component of the pixel of the 2×2 block and reference image data corresponding to the current image data may be calculated.

In operation 195, whether the calculated difference can be represented by bits of a constant length may be determined. If the difference can be represented by bits of a constant length, the process may proceed to operation 196, and if the difference cannot be represented by bits of a constant length, the process may proceed to operation 197.

In operation 196, the difference may be output as compressed data of the current image data.

In operation 197, 8 bits of current image data corresponding to the color component of the pixel of the 2×2 block and 8 bits of reference image data corresponding to the current image data may be shifted, in a unit of 1 bit, in a direction to the right. Then, the indicated number of bit-shifting operations of the current image data may be increased by "1", and the process may return to operation 193.

In operation 198, 4 bits of the 8 bits of current image data corresponding to the color component of the pixel of the 2×2 block may be truncated and the remaining 4 bits of the current image data may be output as compressed data of the current image data.

In operation 199, 4 bits of mode data indicating either of a DPCM encoding mode and a PCM mode corresponding to the number of bit-shifting operations of the current image data may be multiplexed with the total of 44 bits of the compressed data output in respective operation 196 and operation 198, such that the resultant 48 bits of data may be stored, e.g., in the memory 22.

Figure 20:
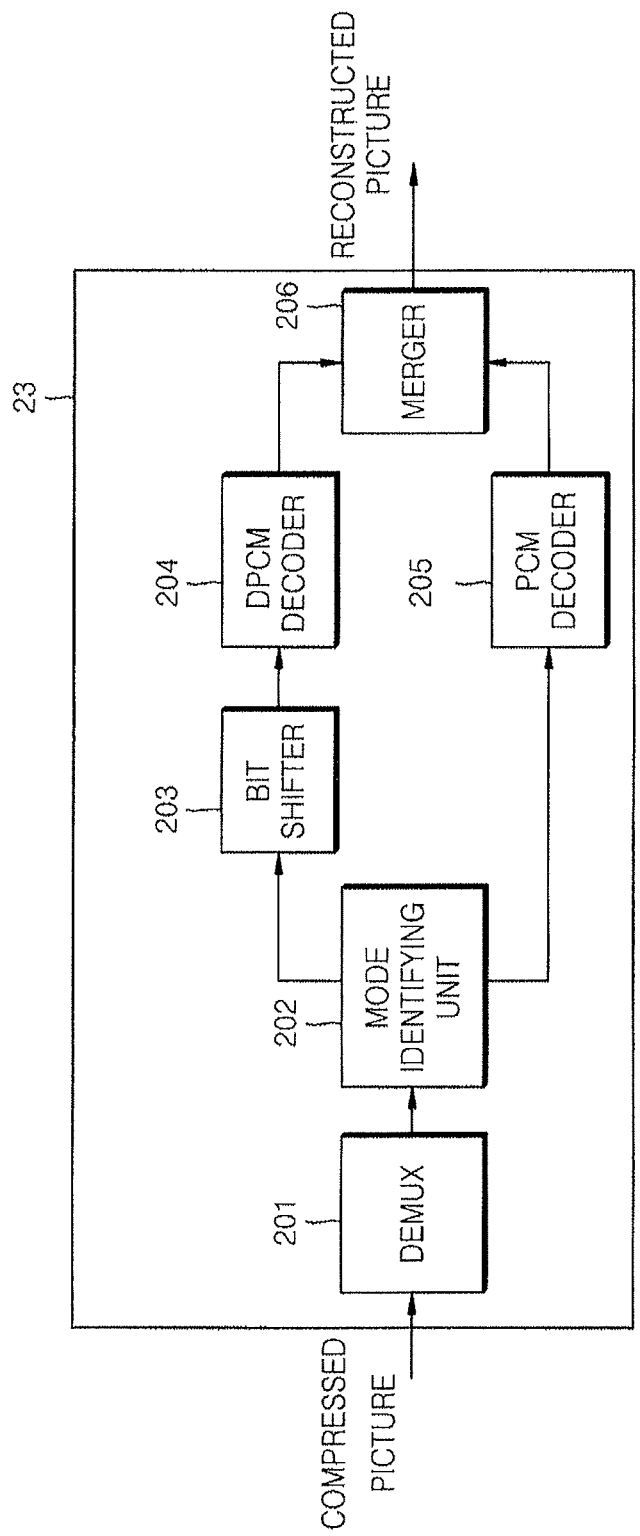
FIG. 20 illustrates a data reconstruction system, such as that illustrated in FIG. 2, according to an embodiment of the present invention.

FIG. 20 illustrates a data reconstruction system, such as the data reconstruction system 23 illustrated in FIG. 2, according to an embodiment of the present invention. Below, the reference to the data reconstruction system 23 is used only as an example, and alternative data reconstruction systems are equally available.

Referring to FIG. 20, the data reconstruction system 23 may include a DEMUX 201, a mode identifying unit 202, a bit shifter 203, a DPCM decoder 204, a PCM decoder 205, and a merger 206, for example.

The DEMUX 201 may read 48 bits of data from the memory 22, extracts 4 bits of mode data and 44 bits of compressed data from the 48 bits of data, and output the 4 bits of mode data and the 44 bits of compressed data to the mode identifying unit 202.

The mode identifying unit 202 identifies the mode selected by the data compression system 21, from among a plurality of modes which can compress current image data corresponding to a 2×2 block, for example, using the example 4 bits of mode data received from the DEMUX 201. In addition, the mode identifying unit 202 may output the 44 bits of compressed data received from the DEMUX 201 to the bit shifter 203 or the PCM decoder 205, according to the identified mode. That is, if the 4 bits of mode data received from the DEMUX 201 indicates one of the modes 0 through 7, the mode identifying unit 202 may output the 44 bits of compressed data received from the DEMUX 201 to the bit shifter 203. Further, if the 4 bits of mode data received from the DEMUX 201 indicates one of the modes 9 through 11, the mode identifying unit 202 may output the 44 bits of compressed data received from the DEMUX 201 to the PCM decoder 205. If the 4 bits of mode data received from the DEMUX 201 indicates the mode 8, the mode identifying unit 202 may output 32 bits of compressed data corresponding to R and G components from among the 44 bits of compressed data received from the DEMUX 201, to the PCM decoder 205, and outputs 12 bits of compressed data corresponding to a B component from among the 44 bits of compressed data received from the DEMUX 201, to the bit shifter 203.

The bit shifter 203 may shift bits of a constant length, e.g., 4 bits of compressed data, corresponding to a difference between 8 bits of current image data and reference image data corresponding to the current image data, by the number of bit-shifting operations of the 8 bits of current image data indicated by the mode identified by the mode identifying unit 202, in a unit of a bit. In particular, the bit shifter 203 may shift the compressed data in a direction to the left, which is the reverse direction of the bit shifting operations performed when the current image data is compressed. Shifting the 4 bits of compressed data to the left in a unit of 1 bit means shifting the image data in the Most Significant Bit (MSB) side. Accordingly, shifting 8 bits of compressed data in a unit of 1 bit is equivalent to doubling the 8 bits of compressed data value.

In addition, the bit shifter 203 may then add a binary value corresponding to the number of bit-shifting operations of the 8 bits of current image data, to the bit-shifted 4 bits of compressed data, thus restoring the difference between the current image data and the reference image data, and output the restored difference to the DPCM decoder 204. For example, if the mode identified by the mode identifying unit 202 is the mode 4, e.g., as illustrated in FIG. 11, the lower 2 bits of the current image data are not considered when the current image data is compressed. Accordingly, the bit shifter 203 may add a binary value "10" as a value of the lower 2 bits to the bit-shifted 4 bits of compressed data The DPCM decoder 204 may add the difference between the current image data and the reference image data, to the 8 bits of reference image data, according to the mode identified by the mode identifying unit 202, thereby reconstructing the 8 bits of current image data. In more detail, if the mode identified by the mode identifying unit 202 indicates a mode in which the DPCM method is used, the DPCM decoder 204 may add the difference between the current image data and the reference image data to the 8 bits of reference image data, thereby reconstructing the 8 bits of current image data. In particular, the DPCM decoder 204 may select reference image data corresponding to the current image data, in a similar manner as the reference image data selecting method is used by the data compression system 21, for example.

The PCM decoder 205 may add 4 bits of a binary value to the 4 bits of compressed data received from the mode identifying unit 202, according to the mode identified by the mode identifying unit 202, thereby reconstructing the current image data. In more detail, if the mode identified by the mode identifying unit 202 is a mode in which the PCM method is used, the PCM decoder 205 adds 4 bits of a binary value, for example, "1000", to the 4 bits of compressed data received from the mode identifier 202, thereby reconstructing the current image data.

The merger 206 may merge the current image data reconstructed by the DPCM decoder 204 and the current image data reconstructed by the PCM decoder 205, that is, to generate the total 96 bits of 2×2 blocks, thereby reconstructing a picture.

Figure 21:
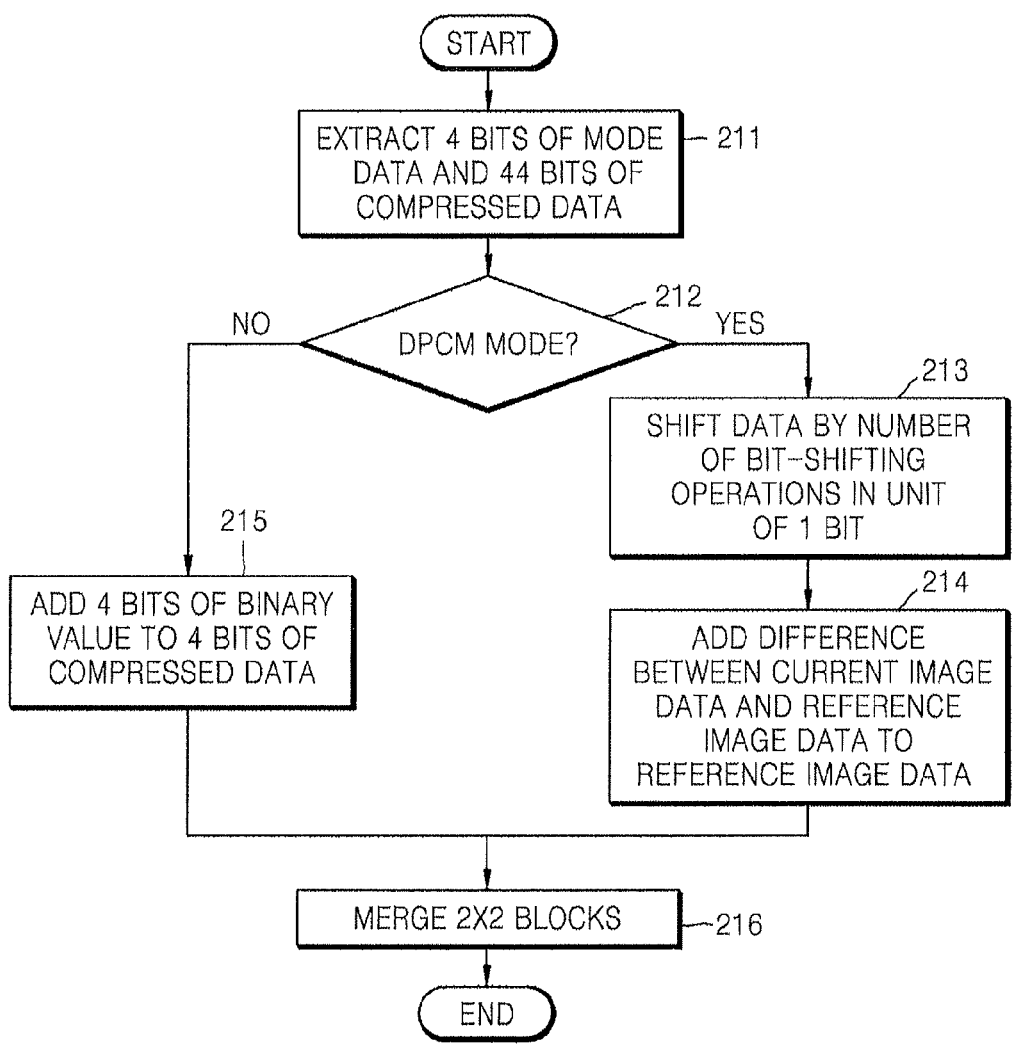
FIG. 21 illustrates a data reconstruction method, according to an embodiment of the present invention.

FIG. 21 illustrates a data reconstruction method, according to an embodiment of the present invention.

Referring to FIG. 21, in an embodiment, the data reconstruction method may include operations which are sequentially processed by the data reconstruction system 23, e.g., as illustrated in FIG. 20. Accordingly, in such an embodiment, above descriptions about the data compression system 23 illustrated in FIG. 20 may similarly be applied to the data compression method.

In operation 211, 48 bits of data may be read from the memory 22, and 4 bits of mode data and 44 bits of compressed data may be extracted from the 48 bits of data.

In operation 212, a mode selected for compression, e.g., by the data compression system 21, from among a plurality of modes which can compress current image data corresponding to a 2×2 block, may be identified from the 4 bits of mode data extracted in operation 211. If the identified mode is a mode in which the DPCM method is used, the process may proceed to operation 213, and if the identified mode is a mode in which the PCM method is used, the process may proceed to operation 215.

In operation 213, 4 or 3 bits of compressed data may be shifted by the number of bit-shifting operations of the 8 bits of current image data indicated by the mode identified in operation 212, in a unit of 1 bit, in a direction to the left, and a binary value corresponding to the number of bit-shifting operations of the 8 bits of current image data may be added to the 4 or 3 bits of compressed data, thereby restoring the difference between the current image data and the reference image data.

In operation 214, the difference between the current image data and the reference image data may be added to the 8 bits of reference image data, thereby reconstructing the 8 bits of current image data.

In operation 215, 4 bits of a binary value may be added to the 4 bits of compressed data, thereby reconstructing the current image data.

In operation 216, the reconstructed current image data reconstructed in operation 214 may be merged with the reconstructed current image data reconstructed in operation 215, to generate the total 96 bits of 2×2 blocks, and thereby reconstructing the corresponding picture.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, by compressing and/or reconstructing image data selectively using one of a DPCM method and a PCM method, it is possible to significantly lower the complexity of an image encoder/decoder system and exactly meet a picture-based CBR required by LCD DCC devices/systems. Furthermore, according to one or more embodiments of the present invention, since data is compressed and/or reconstructed in a unit of a 2×2 block made up of 4 pixels, using the DPCM method and the PCM method, it is possible to compress data without subjective picture quality deterioration of original images.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data compression method comprising:
   determining a difference between first data corresponding to a first pixel and second data corresponding to a second pixel after selectively applying a bit shifting operation on the first data and the second data;
   when the difference satisfies a first specified condition, generating first compressed data corresponding to the first data based at least in part on the difference;
   when the difference satisfies a second specified condition, generating second compressed data corresponding to the first data based at least in part by truncating at least one portion of the first data.

2. The method of claim 1, wherein the generating of the first compressed data is performed when the difference falls within a specified range, and wherein the generating of the second compressed data is performed when the difference falls outside the specified range.

3. The method of claim 1, wherein the determining comprises selecting at least one pixel from among pixels adjacent to the first pixel, and determining the second pixel based on the selected at least one pixel.

4. The method of claim 3, wherein the second data is determined from a pixel of data most similar to the first data from among the pixels adjacent to the first pixel.

5. The method of claim 3, wherein the second data comprises average data of specified pixels adjacent to the first pixel.

6. The method of claim 1, wherein the generating of the first compressed data comprises generating at least one portion of the first data based at least in part on bits having a specified constant length.

7. An apparatus comprising:
- a first encoder configured to generate first compressed data corresponding to first data by using a difference between the first data corresponding to a first pixel and second data corresponding to a second pixel, wherein the first data and the second data have been selectively applied to a bit shift operation; and
- a second encoder configured to, when the difference satisfies a specified condition, generate second compressed data corresponding to the first data by truncating at least one portion of the first data; and
- a memory configured to store output from the first or second encoder.

8. The apparatus of claim 7, wherein the first encoder is configured to generate the first compressed data when the difference falls within a specified range, and wherein the second encoder is configured to generates the second compressed data when the difference falls outside the specified range.

9. The apparatus of claim 7, wherein the second pixel is selected from among at least one pixel adjacent to the first pixel.

10. The apparatus of claim 7, wherein the second data is data most similar to the first data, from among data of at least one pixel adjacent to the first pixel.

11. The apparatus of claim 7, wherein the second data is average data of a plurality of pixels adjacent to the first pixel.

12. The apparatus of claim 7, wherein the first encoder is configured to generate at least one portion of the first data based at least in part on bits having a specified constant length.

13. A data compression method comprising:
- determining a difference between first data corresponding to a first pixel and second data corresponding to a second pixel, wherein the first data and the second data have been selectively applied to a bit shift operation; and
- compressing the first data by using one of a first compression mode or a second compression mode based on whether the difference satisfies a specified condition.

14. The method of claim 13, wherein the compressing of the first data is performed based on whether the difference falls within a specified range.

15. The method of claim 13, wherein the compressing comprises compressing the first data by using the difference in the first compression mode.

16. The method of claim 13, wherein the compressing comprises generating at least one portion of the first data based at least in part on bits having a specified constant length.

17. The method of claim 13, wherein the compressing comprises truncating at least one portion of the first data in the second compression mode.

18. The method of claim 13, wherein the determining comprises determining the second pixel based at least in part on at least one pixel block from among pixels adjacent to the first pixel.

19. The method of claim 13, wherein the second data is determined from a pixel of data most similar to the first data from among pixels adjacent to the first pixel.

20. The method of claim 13, wherein the second data comprises average data of specified pixels adjacent to the first pixel.

* * * * *